United States Patent [19]  [11] Patent Number: 4,652,306
Nakashima et al.  [45] Date of Patent: Mar. 24, 1987

[54] METHOD OF REFINING MOLTEN STEEL BY ARC PROCESS

[75] Inventors: Hirohisa Nakashima; Yoshimi Komatsu; Masafumi Ikeda; Tsuneo Kondo, all of Fukuyama, Japan

[73] Assignee: Nippon Kokan Kabushiki Kaisha, Tokyo, Japan

[21] Appl. No.: 782,526

[22] Filed: Oct. 1, 1985

[30] Foreign Application Priority Data

Oct. 12, 1984 [JP]  Japan ................................. 59-213336
Oct. 12, 1984 [JP]  Japan ................................. 59-213337

[51] Int. Cl.$^4$ ............................ C21C 7/10; C22B 4/00
[52] U.S. Cl. ........................................ 75/10.17; 75/49
[58] Field of Search ...................... 75/10-12, 75/49

[56] References Cited

U.S. PATENT DOCUMENTS 2,978,315  4/1961  Schenck ................................. 75/11
4,212,665  7/1980  Barton et al. ....................... 75/10 R

FOREIGN PATENT DOCUMENTS 7817039  1/1979  France ................................. 75/10 R

OTHER PUBLICATIONS

Research and Development in Japan—The Okochi Memorial Prize, 1982; pp. 22-28, Patent Abstracts of Japan, vol. 8, No. 218.

Primary Examiner—Peter D. Rosenberg
Attorney, Agent, or Firm—Frishauf, Holtz, Goodman & Woodward

[57] ABSTRACT

Molten steel is tapped from a converter into a refining ladle, and an ore such as $Nb_2O_3$ ore is charged into the molten steel. Then, the interior of the refining ladle is held in an inert gas atmosphere. A reducing agent such as an Al reducing agent is charged into the molten steel. Electrodes are dipped in slag on the molten steel to form an arc therebetween so as to heat the molten steel with an arc. The ore is reduced by the reducing agent, so that a metallic component of the ore is added to the molten steel. On the other hand, carbon electrodes each having a gas supply port at its lower end can be used to inject an ore powder or particles from the injection ports to the arc between the electrodes and molten steel. The ore is reduced by electrode carbon with arc heat, so that a desired component is added to the molten steel.

20 Claims, 3 Drawing Figures

METHOD OF REFINING MOLTEN STEEL BY ARC PROCESS

BACKGROUND OF THE INVENTION

The present invention relates to a method of refining molten steel by an arc process, wherein molten steel is tapped from a furnace for obtaining molten steel such as a converter into a refining ladle, electrodes are dipped in slag on the molten steel to form an arc between the electrodes and the molten steel, and the molten steel is heated by the arc, and more particularly, to a method of performing composition adjustment of the molten steel by adding ore in place of a ferro alloy.

In a conventional refining method, in order to adjust the content of niobium (Nb), vanadium (V) or chromium (Cr) in molten steel, molten steel is tapped from a blast furnace such as a converter or an electric furnace into a refining ladle and then a ferro alloy containing Nb, V or Cr is added to the molten steel.

However, the ferro alloy is expensive since it must be manufactured such that ore containing an alloy component must be refined by an electric furnace or the like.

SUMMARY OF THE INVENTION

It is an object of the present invention to provide a method of refining molten steel by an arc process, wherein ore can be used in place of an expensive ferro alloy to decrease the refining cost.

According to an aspect of the present invention, there is provided a method of refining molten steel by arc process, comprising the steps of:
tapping the molten steel into a refining ladle;
sealing the ladle containing the molten steel with a cover to keep the interior of the ladle in an inert gas atmosphere;
adding ore containing a component to be added to the molten steel thereto;
adding a reducing agent for the ore to the molten steel in the inert gas atmosphere;
dipping electrodes in slag on the molten steel;
forming an arc between the electrodes and the molten steel to heat the molten steel; and
stirring the molten steel by supplying a gas into the molten steel after the molten steel is heaed by the arc.

The ore can be selected from additive-containing ores such as Nb ore, V ore and Cr ore. The reducing agent can be selected from Al, Si, C and an alloy thereof.

According to the present invention, since the molten steel is heated by an arc, the ore can be dissolved and can react with the reducing agent, thereby reducing the ore. After the molten steel is heated by an arc, the molten steel is stirred, more precisely, strongly stirred, and the ore is mixed with the molten steel to accelerate a reducing reaction therebetween. In this case, the molten steel is weakly stirred even during arc heating to a degree not to interfere with arc heating of the molten steel. As a result, the ore reduction can be accelerated during arc heating.

According to the present invention, since the interior of the refining ladle is kept in the inert gas atmosphere, the reducing agent will neither be oxidized nor exhausted even if it is added to the molten steel. In this way, even if an inexpensive ore is used in place of the ferro alloy, the ore can be reduced by the reducing agent. The ore can be melted by arc heating and thus can sufficiently react with the reducing agent. In addition, since the molten steel is strongly stirred after the molten steel is heated by an arc, the ore can be mixed well with the reducing agent, and reduction can be further accelerated. Therefore, the reduction efficiency of the ore and hence the yield can be greatly improved according to the present invention.

According to another aspect of the present invention, there is provided a method of refining molten steel by arc process, comprising the steps of:
tapping the molten steel into a refining ladle;
dipping carbon electrodes in slag on the molten steel, each of the carbon electrodes being provided with a rod, a gas injection port formed at a lower end of the rod, and a gas path for supplying a gas to the gas injection port formed in the rod;
forming an arc between the electrodes and the molten steel to heat the molten steel; and
injecting, from the gas injection port through the gas path, the gas carrying a powder or particles of an ore containing a component to be added to the molten steel for a predetermined period of time within an arc heating period.

In this case, an arc region between the molten steel and the electrodes is kept at a temperature of about 3,000° C. The powder or particles of the ore which are injected from the gas injection port at the lower end of the rod are heated through the arc region. Ore reduction caused by electrode carbons occurs between the ore and the electrodes. The reduction produces CO, which can be removed as CO gas. On the other hand, a metal component in the ore is added to the molten steel.

With the above process, even if an inexpensive ore is used in place of an expensive ferro alloy so as to adjust the components of the molten steel, the ore reacts with the carbon electrodes through a high-temperature arc region. The ore is reduced by carbon, so that a desired component can be added to the molten steel. Furthermore, since the ore can be reduced by the carbon of the electrodes, a special reducing agent need not be added to reduce the ore. In a conventional arc process, carbon of the carbon electrodes tends to sublimate due to arc heat. The sublimated carbon is picked up into the molten steel to increase a carbon concentration of the molten steel. According to the present invention, however, since the carbon consumed by reduction is a part of the sublimated carbon in the conventional arc process, the content of carbon picked up in the molten steel can be decreased.

DETAILED DESCRIPTION OF THE PREFERRED EMBODIMENTS

Figure 1:
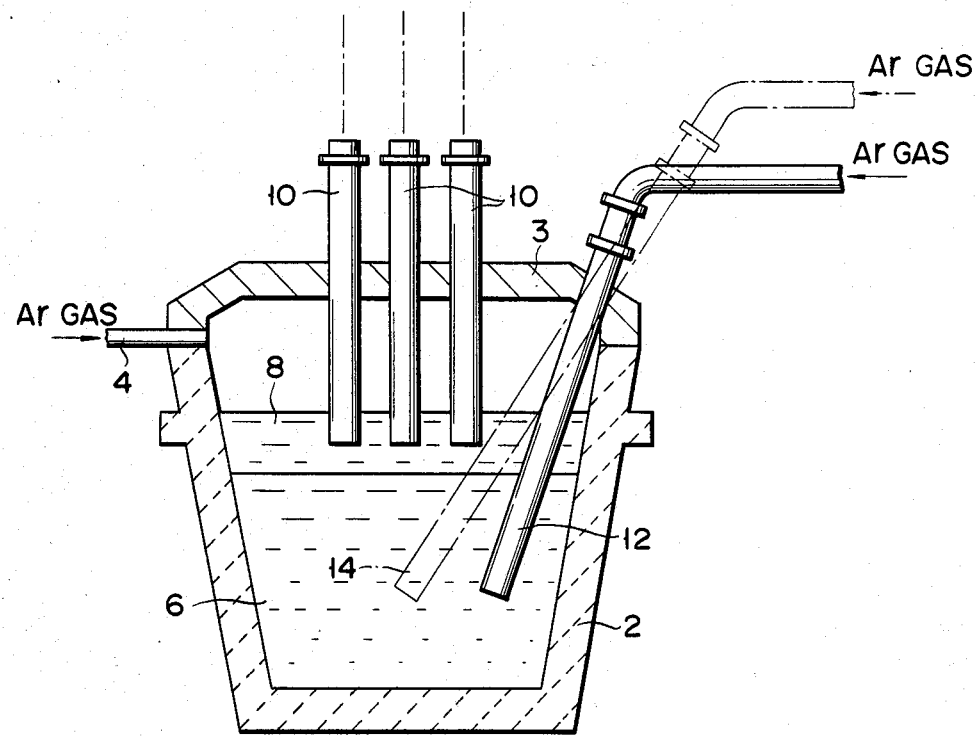
FIG. 1 is a sectional view showing an embodiment of the present invention.

Preferred embodiments of the present invention will be described in detail hereinafter. FIG. 1 is a sectional view showing a state wherein the molten steel is refined in an arc process. Molten steel is tapped from a converter into a refining ladle 2. At the time of tapping, ore containing an element to be contained in the molten steel is charged in the refining ladle in a predetermined amount. The refining ladle 2 is transferred to an arc process factory. In the arc process (to be referred to as AP hereinafter), a cover 3 is placed on the refining ladle 2, and an inert gas is supplied to the ladle 2 through a supply pipe 4 connected to an inert gas source (not shown) such as an Ar gas source. The interior of the ladle 2 is held in the inert gas (e.g., Ar gas) atmosphere. In this state, electrodes 10 are dipped in slag 8 on molten steel 6. A weak stirring lance 12 is inclined and inserted in the ladle 2, and a lower portion of the lance 12 is dipped in the molten steel 6. The lance 12 is inserted so that a gas injection port at the lower end thereof is located at a position separated by about 900 mm from the center along the horizontal direction and by 800 mm from the bottom surface along the vertical direction. The lance 12 is inclined at an angle of 8.8° with respect to the vertical direction. Al, Si, C or an alloy thereof is charged in the molten steel through an insertion port (not shown) formed in a cover 3 of the ladle 2. In this case, since the interior of the ladle 2 is held in the inert gas atmosphere, a reducing agent such as Al will not be oxidized even after being charged in the ladle 2. The reducing agent will not be exhausted before it reduces the ore, so that the ore can be effectively used. Subsequently, an inert gas such as Ar gas is supplied to the molten steel through the lance 12 to weakly stir the molten steel. At the same time, the electrodes 10 are energized to form an arc between the molten steel 6 and the electrodes 10, thereby heating the molten steel. The ore added to the molten steel 6 and the reducing agent are melted. For example, when the ore is V ore and the reducing agent is Al, the ore and the reducing agent are mixed by the following formula to reduce the ore:

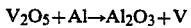

V is added to the molten steel, and $Al_2O_3$ is shifted to the slag on the molten steel. Arc heating and weak stirring are continued for about 10 to 20 minutes, and then arc heating is interrupted.

Thereafter, a strong stirring lance 14 is dipped into the molten steel 6, and Ar gas is supplied to the molten steel at a relatively high flow rate. After the electrodes 10 and the lance 12 are removed from the ladle 2, the lance 14 is inserted so that a lower supply port is located at a central position along the horizontal direction of the ladle 2 and separated by 800 mm from the bottom. The lance 14 is inclined at an angle of about 16°. Ar gas is supplied at a high flow rate of 1,000 to 2,000 Nl/min. through the lance 14 to strongly stir the molten steel 6. The ore such as $V_2O_5$ ore is further mixed with the reducing agent such as an Al reducing agent to accelerate the reduction of the ore, thereby improving the reduction efficiency.

The ore charge timing is not limited to tapping timing. The ore can be charged in the molten steel until arc heating is started. The method of charging the ore and the reducing agent can be performed by a conventional method of charging an additive. When the ore and an alloy are added to the molten steel in the AP after the electrodes 10 and the lance 12 are charged in the ladle 2, Ar gas is preferably supplied in the molten steel at a flow rate of 600 to 800 l/min. through the lance 12 so as to add the alloy to the molten steel without being in contact the slag on the molten steel. In this way, an exposed region of 1 to 1.8 m appears, and the alloy can easily be added to the molten steel through the exposed region.

The above embodiment will be described in detail by way of an example. In this example, molten steel containing 0.010 to 0.020 by weight % of Nb was refined. 250 tons of molten steel were tapped from a converter into a refining ladle. At the time of tapping, 2,250 kg (9 kg/one-ton molten steel) of a silicon (Si) - manganese (Mn) alloy were added to the molten metal. Furthermore, 90 kg (0.36 kg/one-ton molten steel) of Nb ore were added to the molten steel. The composition of Nb ore is shown in Table 1 below:

TABLE 1

| $Nb_2O_5$ | $Ta_2O_5$ | $TiO_2$ | $SiO_2$ | P | S | $SnO_2$ |
|---|---|---|---|---|---|---|
| 61.47 | 0.33 | 3.00 | 3.02 | 0.04 | 0.03 | 0.04 |

The units of content is weight %. Thereafter, in the AP, Al was added to the molten steel at a rate of 1 kg/one-ton molten steel, and arc heating and weak stirring with Ar gas were performed. After arc heating was interrupted, the molten steel was strongly stirred. A change in composition of the molten steel is summarized in Table 2 below:

TABLE 2

|  | C | Si | Mn | P | S | Al | Nb |
|---|---|---|---|---|---|---|---|
| I | 17 | — | 13 | 15 | 4 | — | — |
| II | 76 | 14 | 71 | 14 | 4 | 3 | 0.81 |
| III | 89 | 13 | 82 | 15 | 4 | 186 | 1.34 |
| IV | 118 | 20 | 82 | 17 | 3 | 45 | 1.53 |
| V | 145 | 20 | 91 | 16 | 2 | 56 | 1.55 |
| VI | 155 | 21 | 90 | 16 | 2 | 45 | 1.52 |

The unit of content is $\times 10^{-2}\%$. I represents a molten steel composition at the end of operation of the converter, II represents a molten steel composition at the end of charging of Nb ore and Al, III represents a molten steel composition at the end of arc heating, IV represents a molten steel composition at the end of strong stirring, V represents a molten steel composition at the end of the AP, and VI represents a molten steel composition at the crude steel stage during continuous casting. As is apparent from Table 2, an Nb content in the molten steel was increased along with the progress of the AP after the ore was charged. The Nb content of the molten steel fell within a desired range after strong stirring was completed. In the crude steel stage, the Nb content was 0.0152%. A reduction rate of the Nb ore was 91.5%.

Figure 2:
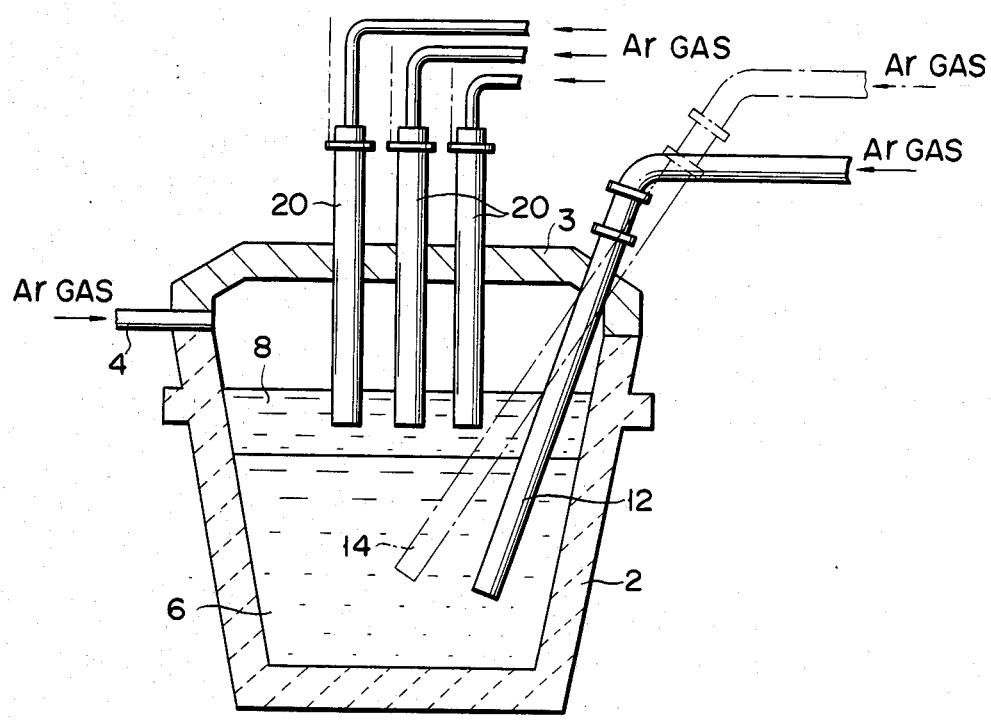
FIG. 2 is a sectional view showing another embodiment of the present invention.
Figure 3:
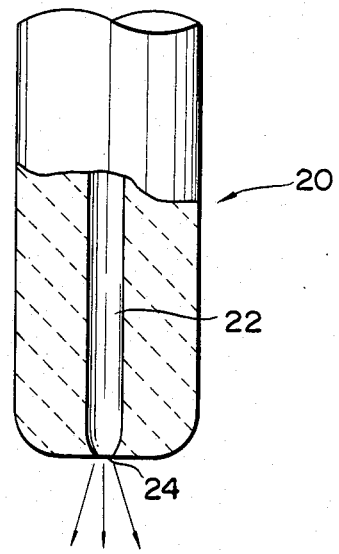
FIG. 3 is a sectional view showing part of an electrode used in the structure of FIG. 2.

A second embodiment according to the present invention will be described with reference to FIGS. 2 and 3. The same reference numerals in the second embodiment denote the same parts as in the first embodiment of FIG. 1, and a detailed description thereof will be omitted.

Electrodes 20 are made of a carbon material and have a rod-like shape. Each electrode 20 has a central gas path 22 extending along its longitudinal direction. The gas path 22 constitutes a gas injection port 24 at a lower end of each electrode 20. The upper end of the gas path 22 is connected to an Ar gas source through a connecting means such as a pipe. An adding means (not shown) is arranged in the connecting means to add a powder or particles of ore to Ar gas flowing through the connecting means. The Ar gas carrying the powder or particles of the ore is injected from the supply port 24 through the gas path 22 formed in each carbon electrode 20. The ore contains a component to be added to molten steel 6 and can be exemplified by $Nb_2O_5$, $V_2O_5$ or $Cr_2O_3$. A flow rate of Ar gas is 500 to 4,000 Nl/min. and normally 2,000 Nl/min. A spray pressure at the supply port 24 is 4 to 25 kg/cm², and normally 8 kg/cm².

A weak stirring lance 12 is inclined and inserted in a refining ladle 2, and a lower portion of the lance 12 is dipped in the molten steel 6. The lance 12 is inserted so that the lower end thereof is located at a position separated by about 900 mm from the center along the horizontal direction and by 800 mm from the bottom of the ladle 2 along the vertical direction. The lance 12 is inclined at an angle of 8.8° with respect to the vertical direction. An inert gas such as Ar gas is supplied to the molten steel through the lance 12 to weakly stir the molten steel. At the same time, the electrodes 20 are energized to form an arc between the molten steel 6 and the electrodes 20, thereby arc heating the molten steel. The arc region is heated to a high temperature of 3,000° C., so that the lower end portions of the carbon electrodes 20 are heated to a high temperature. The ore powder or particles are carried in the Ar gas, and a mixture is sprayed from the injection ports into the molten steel 6. The powder or particles pass through the lower vicinity of the electrodes and the arc region which are kept at a high temperature. The ore is heated and reduced by carbon of the electrodes 20 between the ore and the electrodes 20. When Cr ore is used, the reduction occurs according to the following formula:

$$Cr_2O_3 + 3C \rightarrow 3CO + 2Cr$$

CO is removed as CO gas, and Cr is added to the molten steel. When arc heating and weak stirring are continued for about 10 minutes to 20 minutes, arc heating is interrupted. The reaction between the electrodes and the ore oxidizes and wears the electrodes. However, even in the conventional AP wherein the ore powder is not injected from the electrodes, carbon sublimates by a high temperature of the electrodes upon formation of an arc, so that 0.28 kg of carbon are consumed per ton of molten steel for one charge. Some portion of the sublimated carbon is introduced into the molten steel to increase the carbon content. According to the second embodiment of the present invention, however, electrode carbon is removed as CO gas, thereby decreasing carbon pickup by the molten steel. The portion of carbon consumed by oxidation is the same as that consumed in the conventional process. Therefore, carbon consumption is not large as compared with that of the conventional AP.

Thereafter, a strong stirring lance 14 is dipped into the molten steel 6, and Ar gas is supplied to the molten steel at a relatively high flow rate, thereby strongly stirring the molten steel. After the electrodes 20 and the lance 12 are removed from the ladle 2, the lance 14 is inserted so that a lower supply port is located at a central position along the horizontal direction of the ladle 2 and separated by 800 mm from the bottom. The lance 14 is inclined at an angle of about 16°. Ar gas is supplied at a high flow rate of 1,000 to 2,000 Nl/min. through the lance 14 to strongly stir the molten steel 6. The composition of the molten steel and its temperature are rendered uniform. The molten steel is heated by an arc again to increase the temperature of the molten steel. If required, the ore powder carried by the Ar gas may be sprayed from the ports 24 of the electrodes 20 to reduce the ore upon reaction between the carbon electrodes and the ore, thereby performing composition adjustment of the molten steel. The ore may be added through all carbon electrodes or through a single carbon electrode. The carrier gas is not limited to Ar gas but can be extended to another inert gas or to nitrogen gas when the molten steel is free from the problem of nitrogen pickup.

What is claimed is:

1. A method of refining molten steel by an arc process, comprising the steps of:
    tapping the molten steel into a refining ladle;
    sealing said ladle containing the molten steel with a cover to keep an interior of said ladle in an inert gas atmosphere;
    adding a reducing agent for said ore to said molten steel in the inert gas atmosphere;
    dipping carbon electrodes in slag on the molten steel, each of said carbon electrodes being provided with a rod, a gas injection port formed at a lower end of said rod, and a gas path for supplying a gas to said gas injection port formed in said rod;
    forming an arc between said carbon electrodes and the molten steel to heat the molten steel;
    injecting, from said gas injection port through said gas path, a gas carrying a powder or particles of an ore containing a component to be added to the molten steel for a predetermined period of time within an arc heating period; and
    stirring the molten steel by supplying a gas into the molten steel after the molten steel is heated by the arc.

2. A method according to claim 1, further comprising the step of supplying the gas into the molten steel for a predetermined period of time during arc heating to stir the molten steel.

3. A method according to claim 1, comprising injecting said gas from said injection ports of said electrodes at a flow rate of 500 to 4,000 Nl/min. and a pressure of 4 to 25 kg/cm².

4. A method according to claim 3, wherein said gas path is coaxial with said rod.

5. A method according to claim 1, wherein said ore comprises one ore selected from the group consisting of $Nb_2O_5$, $V_2O_5$ and $Cr_2O_3$.

6. A method according to claim 5, wherein said reducing agent comprises one material selected from the group consisting of Al, Si and C.

7. A method according to claim 4, wherein said ore comprises one ore selected from the group consisting of $Nb_2O_5$, $V_2O_5$ and $Cr_2O_3$.

8. A method according to claim 1, wherein said gas supplied into the molten steel during said stirring step comprises Ar gas.

9. A method according to claim 3, wherein said gas supplied into the molten steel during said stirring step comprises Ar gas.

10. A method according to claim 9, wherein said gas supplied during said stirring step is supplied at a flow rate of 1000 to 2000 Nl/min.

11. A method according to claim 1, wherein said step of injecting said gas from said injection ports of said electrodes provides a weak stirring effect, and wherein said stirring step provides a stirring effect which is greater than the stirring effect provided by said injection of said gas from said injection ports of said electrodes.

12. A method according to claim 1, wherein said stirring step comprises inserting a lance into said molten steel in said ladle, said lance having a lower supply port located at a position below the surface of said molten steel, said stirring gas being supplied through said lance to exit from said lance at said lower supply port to thereby stir the molten steel in said ladle, thereby accelerating the reduction of the ore.

13. A method of refining molten steel by an arc process, comprising the steps of:
tapping the molten steel into a refining ladle;
dipping carbon electrodes in slag on the molten steel, each of said carbon electrodes being provided with a rod, a gas injection port formed at a lower end of said rod, and a gas path for supplying a gas to said gas injection port formed in said rod;
forming an arc between said carbon electrodes and the molten steel to heat the molten steel; and
injecting, from said gas injection port through said gas path, a gas carrying a powder or particles of an ore containing a component to be added to the molten steel for a predetermined period of time within an arc heating period.

14. A method according to claim 13, comprising injecting said gas from said injection ports of said electrodes at a flow rate of 500 to 4,000 Nl/min. and a pressure of 4 to 25 kg/cm$^2$.

15. A method according to claim 14, wherein said gas path is coaxial with said rod.

16. A method according to claim 15, wherein said ore comprises one ore selected from the group consisting of $Nb_2O_5$, $V_2O_5$ and $Cr_2O_3$.

17. A method according to claim 13, further comprising the step of stirring the molten steel by supplying a gas into the molten steel through a lance which is dipped in the molten steel after the molten steel is heated by the arc.

18. A method according to claim 17, wherein said gas supplied into the molten steel through the lance during said stirring step comprises Ar gas.

19. A method according to claim 18, wherein said gas supplied through the lance during said stirring step is supplied at a flow rate of 1,000 to 2,000 Nl/min.

20. A method according to claim 13, wherein said gas injected from said injection port comprises Ar gas.

* * * * *